United States Patent  
Hall et al.

(10) Patent No.: US 10,108,261 B1  
(45) Date of Patent: Oct. 23, 2018

(54) EYE TRACKING BASED ON LIGHT POLARIZATION

(71) Applicant: Oculus VR, LLC, Menlo Park, CA (US)

(72) Inventors: Michael Hall, Seattle, WA (US); Robin Sharma, Redmond, WA (US); Nicholas Daniel Trail, Bothell, WA (US); Robert Dale Cavin, Kirkland, WA (US)

(*) Notice: Subject to any disclaimer, the term of this patent is extended or adjusted under 35 U.S.C. 154(b) by 0 days.

(21) Appl. No.: 15/642,112

(22) Filed: Jul. 5, 2017

(51) Int. Cl.
- *G06F 3/01* (2006.01)
- *G01S 17/66* (2006.01)
- *G06K 9/20* (2006.01)
- *G06K 9/00* (2006.01)

(52) U.S. Cl.
CPC .............. *G06F 3/013* (2013.01); *G01S 17/66* (2013.01); *G06K 9/0061* (2013.01); *G06K 9/00604* (2013.01); *G06K 9/209* (2013.01)

(58) Field of Classification Search
CPC . G06F 3/013; G06K 9/00597–9/00617; G02B 27/0093; G02B 2027/0187; G06T 2207/30041
See application file for complete search history.

(56) References Cited

U.S. PATENT DOCUMENTS

| | | | | |
|---|---|---|---|---|
| 5,016,282 | A * | 5/1991 | Tomono | G06F 3/013 382/117 |
| 8,824,779 | B1 * | 9/2014 | Smyth | G06K 9/0061 382/100 |
| 9,737,209 | B2 * | 8/2017 | Gramatikov | G06K 9/00604 |
| 2016/0225154 | A1 * | 8/2016 | Zhou | G06K 9/00604 |

OTHER PUBLICATIONS

Kadambi, A. et al., "Polarized 3D: High-Quality Depth Sensing with Polarization Cues," The IEEE International Conference on Computer Vision (ICCV), 2015, pp. 3370-3378.

* cited by examiner

*Primary Examiner* — Laurence J Lee  
(74) *Attorney, Agent, or Firm* — Fenwick & West LLP

(57) ABSTRACT

A head mounted display (HMD) comprises an eye tracking system configured to enable eye-tracking using polarization. The eye tracking system includes an illumination source and an eye tracking unit comprising a polarization sensitive optical detector. The one or more illumination sources are configured to illuminate an eye and generate reflections directed towards the optical detector. The eye tracking unit is configured to determine a 3D shape of the eye based on the polarization of the reflections. The determined 3D shape of the eye is used to update a stored model of the eye in response to the one or more model parameter values extracted from the determined depth map of the corneal surface. The eye tracking system determines eye tracking information based on the updated model in order to improve eye tracking performance.

20 Claims, 5 Drawing Sheets

EYE TRACKING BASED ON LIGHT POLARIZATION

BACKGROUND

The present disclosure generally relates to eye tracking, and specifically to eye tracking based on light polarization.

Eye tracking is an important feature for head-mounted display (HMD) systems including systems used in virtual reality (VR) applications. Conventional tracking systems track features of the human eye and are typically limited by the quality of the optical path. These conventional systems do not provide sufficient accuracy needed for eye tracking in a HMD system.

SUMMARY

A head mounted display (HMD) comprises an eye tracking system that tracks a user of the HMD's eye(s) based in part on polarization of light reflected from the eye(s). The eye tracking system can be used in a virtual reality (VR) system environment or other system environments, such as an augmented reality (AR) system. The eye tracking system includes one or more illumination sources configured to illuminate a user's eye using light and an optical detector to capture polarized light reflecting from the user's cornea. The optical detector and the one or more illumination sources are positioned relative to each other such that the optical detector is able to capture light emitted by the one or more illumination sources and reflected from the user's eye (hereinafter referred to as "eye reflections"). In an embodiment, the optical detector comprises an array of polarization sensitive pixels and is able to determine the polarization state (e.g., polarization angle) of the eye reflections. The determined polarization state of the eye reflections at each pixel of the optical detector is used to determine a 3D shape of the eye. In various embodiments, the system additionally determines a new 3D shape of the eye as the user moves their eyes (e.g., as a user gazes at different objects on a display during normal operation). The system retrieves a stored model of the eye comprising two or more spheres wherein the spheres represent the overall eye and the cornea. In various embodiments, the retrieved model is parameterized by a radius and an origin of each of the spheres comprising the model. In an embodiment, the system extracts one or more parameters values from the generated depth map. Responsive to a determining a difference in at least one of the one or more extracted model parameter values and the one or more parameters associated with the retrieved model, the one or more parameters associated with the retrieved model are updated. The system uses the eye model to determine various types of eye tracking information such as a user's gaze direction, vergence angle/depth, and accommodation depth.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1A:
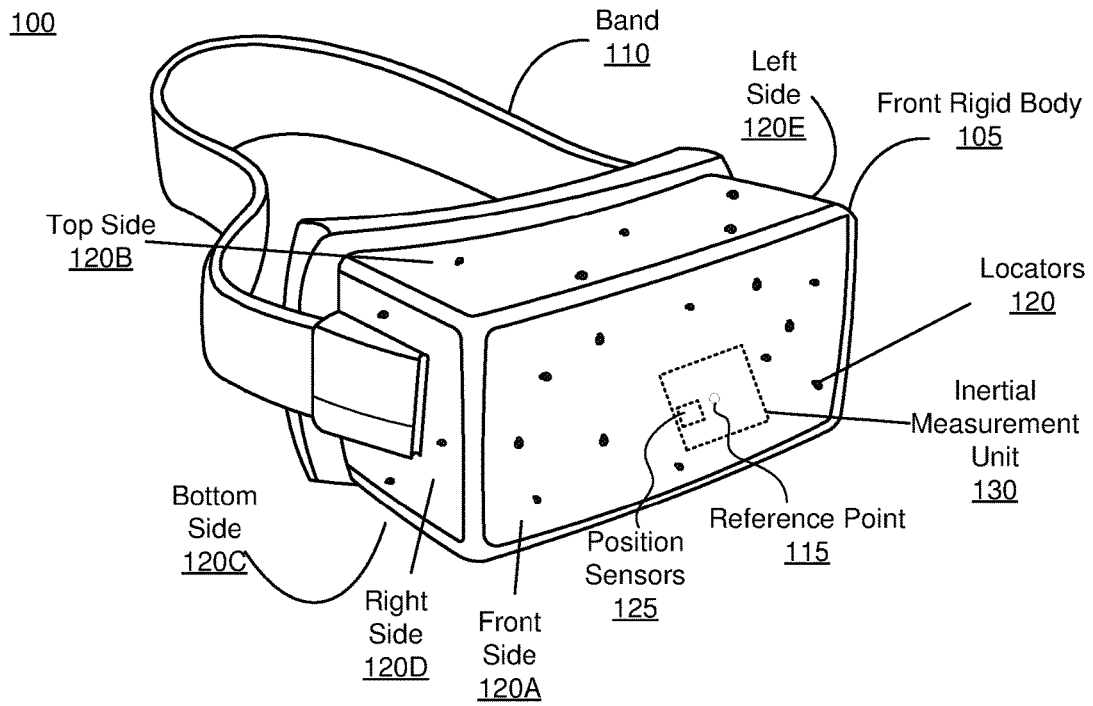
FIG. 1A is a diagram of a HMD, in accordance with an embodiment.

FIG. 1A is a diagram of a head mounted display (HMD) 100, in accordance with an embodiment. The HMD 100 may be part of, for example, a VR system, an augmented reality (AR) system, a mixed reality (MR) system, or some combination thereof. In embodiments that describe AR system and/or a MR system, portions of a front side 120A (and/or some other portion of the HMD 100) of the HMD 100 are at least partially transparent in the visible band (~380 nm to 750 nm), and portions of the HMD 100 that are between a front side 120A (and/or some other portion of the HMD 100) of the HMD 100 and an eye of the user are at least partially transparent (e.g., a partially transparent electronic display). The HMD 100 includes a front rigid body 105 and a band 110. The front rigid body 105 includes an inertial measurement unit (IMU) 130, one or more position sensors 125, and one or more locators 120. In the embodiment shown by FIG. 1A, the position sensors 125 are located within the IMU 130, and neither the IMU 130 nor the position sensors 125 are visible to the user.

The locators 120 are located in fixed positions on the front rigid body 105 relative to one another and relative to a reference point 115. In the example of FIG. 1A, the reference point 115 is located at the center of the IMU 530. In various embodiments, each of the locators 120 emit light that is detectable by an external imaging device. Locators 120, or portions of locators 120, are located on the front side 120A, a top side 120B, a bottom side 120C, a right side 120D, and a left side 120E of the front rigid body 105 in the example of FIG. 1A.

In the embodiment shown by FIG. 1, the position sensors 125 are located within the IMU 130, and neither the IMU 130 nor the position sensors 125 are visible to a user of the HMD 100. The IMU 135 is an electronic device that generates fast calibration data based on measurement signals received from one or more of the position sensors 125. A position sensor 125 generates one or more measurement signals in response to motion of the HMD 100. Examples of position sensors 125 include: one or more accelerometers, one or more gyroscopes, one or more magnetometers, and another suitable type of sensor that detects motion, a type of sensor used for error correction of the IMU 1309, or some combination thereof. The position sensors 125 may be located external to the IMU 135, internal to the IMU 135, or some combination thereof.

Figure 1B:
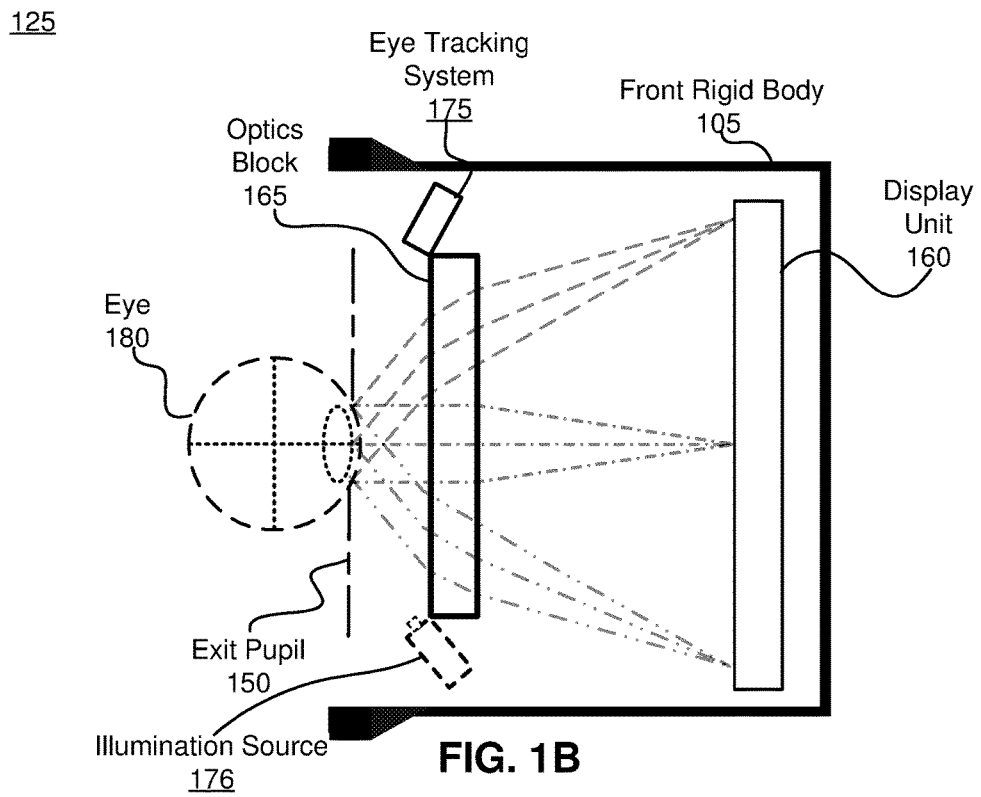
FIG. 1B is a cross section of a front rigid body of the HMD in FIG. 1A, in accordance with an embodiment.

FIG. 1B is a cross section 125 of the front rigid body 105 of the embodiment of a HMD 100 shown in FIG. 1A. As shown in FIG. 1B, the front rigid body 105 provides altered image light to an exit pupil 150. The front rigid body 105 includes an exit pupil 150, a display unit 160, an optics block 165, an eye tracking system 175, and an illumination source 176. While, depicted separate from the eye tracking system 175 in FIG. 1B, in some embodiments, the eye tracking system 175 includes, optionally, the illumination source 176. The exit pupil 150 is a location within an eyebox (e.g., region in space where an eye of a user occupies while wearing the HMD 100) of the HMD 100 where an eye 180 is positioned. For purposes of illustration, FIG. 1B shows a cross section 125 associated with a single eye 180, but in other embodiments, the front rigid body 105 provides altered image light to another eye of the user. The eye tracking system 175 and the illumination source 176 facilitate tracking the eye 180 based on polarization information associated with the light reflected from the eye 180. The optics block 165 provides altered image light generated by the display unit 160 to the eye 180. In various embodiments, the illumination source 176 is part of the display unit 160 and the eye 180 is illuminated through the optics block 165. These elements are further described below.

The display unit 160 emits image light toward the optics block 165. In various embodiments, the display unit 160 may comprise a single electronic display or multiple electronic displays. Examples of an electronic display include: a liquid crystal display (LCD), an organic light emitting diode (OLED) display, an active-matrix organic light-emitting diode display (AMOLED), a quantum organic light emitting diode (QOLED) display, a quantum light emitting diode (QLED) display, a transparent organic light emitting diode (TOLED) display, some other display, or some combination thereof. In alternate embodiments, one or more pixels of the display unit 160 act as the illumination source 176.

The optics block 165 magnifies received light from the display unit 160, corrects optical errors associated with the image light, and the corrected image light is presented to a user of the HMD 100. The optics block 165 is an optical element, such as an aperture, a Fresnel lens, a convex lens, a concave lens, a filter, or any other suitable optical element that directs the light emitted from the display unit 160 towards the user. In other embodiments, the optics block 165 may include combinations of different optical elements. In some embodiments, one or more of the optical elements in the optics block 165 may have one or more coatings, such as partial reflectors or anti-reflective coatings.

Magnification of the image light by the optics block 165 allows the display unit 160 to be physically smaller, weigh less, and consume less power than larger displays. Additionally, magnification may increase a field of view of the displayed content. For example, the field of view of the displayed content is such that the displayed content is presented using almost all (e.g., 110° diagonal), and in some cases all, of the user's instantaneous field of view. In some embodiments, the optics block 165 is designed so its effective focal length is larger than the spacing to the display unit 160, which magnifies the image light projected by the display unit 160. Additionally, in some embodiments, the amount of magnification may be adjusted by adding or removing optical elements.

The optics block 165 may be designed to correct one or more types of optical error. Examples of optical error include: distortion, chromatic aberration, spherical aberration, field curvature, astigmatism, or any other type of optical aberrations. In some embodiments, content provided to the display unit 160 for display is pre-distorted, and the optics block 165 corrects the distortion when it receives image light from the display unit 160 generated based on the content.

The eye tracking system 175 updates a model of the eye 180 and determines eye tracking information associated with the eye 180. The eye tracking system 175 may include one or more optical detectors and optionally includes the illumination source 176. The optical detectors capture eye reflections from the eye 180 and determine a polarization state of the eye reflections. Based on the determined polarization state of the eye reflections, the eye tracking system 175 determines a depth map of the corneal surface and updates a model of the eye 180. As the user looks at various objects within the HMD 100, the eye tracking system 175 is configured to determine the user's gaze direction, vergence angle/depth, and accommodation depth.

The illumination source 176 illuminates the eye 180 with light. The illumination in this embodiment, the illumination source 176 is external to the eye tracking system 175. In alternate embodiments, the illumination source 176 may be integrated into the eye tracking system 175. The illumination source 176 comprises one or more optical sources configured to illuminate the eye 180 with light. The illumination source 176 may emit light in the visible band (~380 nm to 750 nm), the IR band (~750 nm to ~1,800 nm), some other band of light, or some combination thereof. The illumination source 175 may be a laser (e.g., a tunable laser, a continuous wave laser, a pulse laser, other suitable laser emitting light), a light emitted diode (LED), a fiber light source, another other suitable light source emitting infrared and/or visible light, or some combination thereof. Additionally, the illumination source 176 may emit light that is unpolarized, linearly polarized, circularly polarized, or any combination thereof. In various embodiments, the one or more illumination sources 176 are located off-axis to not obstruct a user's view of the display unit 160. Each of the one or more illumination sources 176 (also referred to herein as illuminator) periodically illuminates a portion of the eye 180 with light at a predetermined illumination power. The predetermined illumination power is less than a threshold that causes injury to the eye.

As noted above, in alternate embodiments, the illumination source 176 is part of the display unit 160. That is, the illumination source 176 may comprise one or more LEDs which are integrated into the electronic display associated with the display unit 160. In these embodiments, the display unit 160 is configured to periodically illuminate the eye 180. For example, if the refresh rate of the electronic display associated with the display unit 160 is 60 Hertz, the display unit 160 may be configured to illuminate the eye 180 for 30 milliseconds during 1 second of dead time between consecutive electronic display activations.

The light emitted by the illumination source 176 is incident on a portion of the eye 180 from a wide range of angles. In embodiments where the illumination source 176 is part of the display unit 160, this is easily achieved. However, in embodiments, where the illumination source 176 is separate and distinct from the display unit 160, the illumination source 176 is additionally coupled to a diffuser and the illumination source 176 is configured to produce multiple reflections within the HMD 100. Materials of the HMD 100 and illuminator 176 may be chosen to enable diffuse, not specular, reflections, thereby maintaining the polarization state (e.g., unpolarized light) upon reflection. For example, in the embodiment described above, materials for the HMD 100 and/or the illuminator 176 are chosen in order to ensure that the reflected light remains unpolarized. It should be noted that in one or more embodiments, the light emitted by the illumination sources 176 is incident on the eye from every possible angle [0, 2π].

A portion of the eye 180 to be illuminated by the illumination source 176 may be selected for detection of a change in polarization upon reflection. That is, portions of the eye 180 that result in a change in polarization upon reflection during eye movement are selected for illumination by the illumination source 176. For example, the illuminated portion of the eye 180 may have a maximum reflectivity. The illuminated portion may be located on, e.g., an edge of the sclera, surface of the cornea, a limbus (e.g., junction of the cornea and sclera, a junction of the iris and the sclera, a junction of the iris and pupil, or any other suitable junction in the eye).

The light reflected from the eye 180 is captured by the eye tracking system 175. In various embodiments, at the boundary between the corneal surface and air, the light from the illumination source 176 is reflected towards the eye tracking system 175. The shape (e.g., radius of curvature) of the corneal surface causes small changes in the polarization state of the reflected light. In one or more embodiments, un-polarized light incident on a corneal surface is reflected off of the corneal surface towards the eye tracking system 175. The incident un-polarized light (e.g., emitted from the illumination source 176) that is reflected off of the corneal surface of the eye 180 is partially polarized. For example, s- and p-polarized light has different reflection coefficients and light reflected towards the eye tracking system 175 have a different intensity based on at least, a polarization angle and a polarization state. The intensity of light captured at each polarization angle (e.g., 0°, 45°, 90°, and 135°) is related to the size and shape of the corneal surface. In other embodiments, light captured by the eye tracking system 175 includes light polarized at an arbitrary polarization angle between 0° and 360°. In one or more embodiments, the eye tracking system 175 generates an image of the corneal surface from intensities captured at three or more polarization angles. For example, in the example above, the eye tracking system 175 determines an image of the corneal surface at polarization angles of 0°, 45°, 90°, and 135°. The eye tracking system 175 is further described below in conjunction with FIG. 2.

The eye tracking system 175 determines a 3D shape of the eye 180 based on the one or more captured images of the corneal surface. The captured images of the corneal surface include an intensity and a polarization information. Some, or all, of the eye tracking system 175 may or may not be in a line of sight of a user wearing the HMD 100. The eye tracking system 175 is typically located off-axis to avoid obstructing the user's view of the display unit 160. In other embodiments, the eye tracking unit 175 may alternately be placed elsewhere. There is at least one eye tracking system 175 for the user's left eye and at least one tracking unit for the user's right eye. However, it should be noted that in still other embodiments, one eye tracking system 175 may track both the left and right eye of the user. In some embodiments, the eye tracking system 175 and/or the illumination source 176, both, utilize the optics block 165 to image and illuminate the eye 180. For example, the optics block 165 may include a hot mirror positioned to receive IR light from the illumination source and reflect the received eye reflections towards to the eye tracking system 175.

The eye tracking system 175 updates a model of the eye 180 based on the determined 3D shape of the eye 180. In various embodiments, the eye tracking system 175 determines eye tracking information based at least in part on the updated eye model. Eye tracking information describes a position and/or an orientation of the eye 180. The eye tracking system 175 is coupled to a polarization sensitive camera including one or more illumination sources to perform the necessary data processing for generating the eye model and determining eye tracking information. Eye tracking information determined by the eye tracking system 175 includes a gaze direction (also referred to a direction of a fovea axis that is an axis that bisects a center of a fovea and a center of an eye's pupil), a gaze position (also referred to as an fixation point where the user is looking), gaze time (how long the user is looking a particular direction), a vergence angle (an angle between two eyes when the user changes viewing distance and gaze direction), an interpupillary distance (IPD, defined as the distance between the center of the pupils of the two eyes) of the user. For example, the eye tracking system 175 can determine IPD by estimating eye position when the user is focused at infinity or, e.g., another object far from the user. In the example above, the eye tracking system 175 determines a gaze direction by extrapolating a direction based on the estimated position and determined IPD. The eye tracking system 175 determines vergence angle by estimating changes of a user is viewing distance and gaze direction. The eye tracking system 175 is able to determine the foveal axis, the orientation the orientation of the foveal axis from a pupillary axis, and a change in the shape of the eye 180.

Based on the determined and tracked position and orientation of the eye 180 (i.e., eye-gaze), the HMD 100 may adjust presentation of an image displayed on the display unit 160. In some embodiments, the HMD 100 may adjust resolution of the displayed image based on the eye tracking information. In an example embodiment, a maximum pixel density for displaying an image on the display unit 160 can be provided only in a foveal region of the determined eye-gaze, whereas a lower resolution display is employed in other regions, without negatively affecting the user's visual experience. The eye tracking system 175 is further described, below, in conjunction with FIG. 2.

Eye Tracking System for Generating Eye Model

Figure 2:
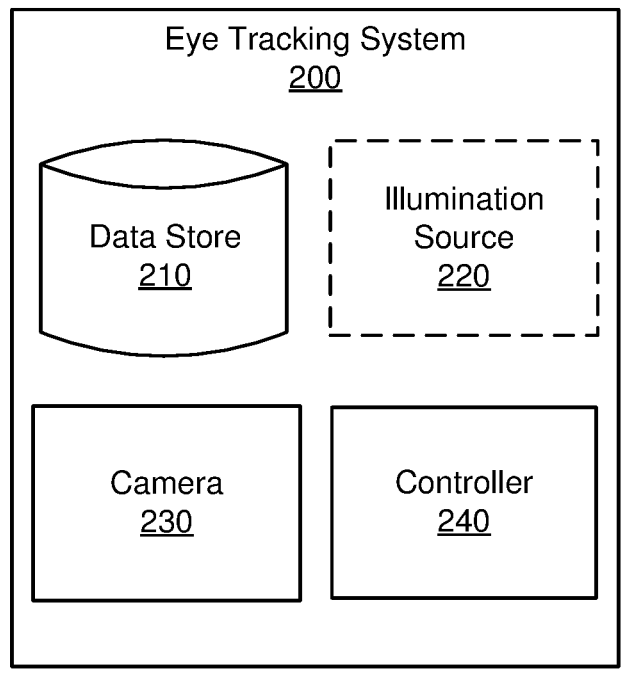
FIG. 2 depicts a block diagram of an eye tracking system in accordance with an embodiment.

FIG. 2 depicts a block diagram of an eye tracking system 200 in accordance with an embodiment. The eye tracking system 200 determines eye tracking information for an eye associated with a user (e.g., eye 180). In one or more embodiments, the eye tracking information is determined based on polarization information associated with light reflected and/or scattered from the eye. Eye tracking information includes information about a position and orientation of the user's eye in an eye-box (i.e., information about an angle of an eye-gaze). The eye tracking system 200 includes a data store 210, an illumination source 220 (optional), a camera 230, and a controller 240. In other embodiments, the eye tracking system 200 may contain additional or fewer elements than those discussed herein. In some embodiments, the eye tracking system 200 is an embodiment of the eye tracking system 175. In other embodiments, the eye tracking system 200 is a component of some other system that performs eye tracking.

The data store 210 stores one or more models of eyes (e.g., eye 180) of users. In an embodiment, a stored model of an eye in the data store 210 comprises two spheres. Together these spheres represent the eye associated with the user including the user's cornea. In one or more embodiments, the model of the eye is parameterized by characteristics of the two spheres. For example, the model of the eye is parameterized by the radius of each sphere, a location of the centers of the two spheres, and a distance between the centers of these spheres. The values of the model parameters associated with a given model are stored within the data store 210. The model and the model parameters are stored in the data store 210 as a <key, value> pair. In an embodiment, the key is the name of a model and value represents a model parameter associated with the model, respectively. A model parameter may describe, e.g., a radius of a corneal sphere, a center location of the corneal sphere, a radius of an eye sphere, a center of the eye sphere, a pupil diameter, a pupil location, optical axis, or some other parameter associated with a model of the eye. As is described in detail below with regard to FIG. 3, an eye may be modeled using two spheres. An eye sphere, a portion of which generally maps to the sclera of the eye, and a corneal sphere, a portion of which describes a corneal surface of the eye. In one or more embodiments, the model of an eye is segmented into one or more parts (i.e., iris, sclera, pupil, etc.). Here, each of the segmented portions of the eye model are also stored in the data store 210 as <key, value> pairs. In some embodiments, each of the model parameters associated with a model is stored as a key value pair such as <key, value1, value2>. For example, a model of the eye associated with a user named John with smaller sphere (e.g., the corneal sphere) radius of 8 mm and a larger sphere (e.g., the eye sphere) radius of 25 mm, is stored as <John, 25, 8>. In other embodiments, the data store 210 additionally stores other parameters associated with an eye model. For example, other model parameters stored in the data store 210 include sphere orientation, and sphere location. Eye models are further described below in conjunction with FIG. 3. In other embodiments, other storage schemes may additionally or alternatively be employed to store and retrieve a model of the eye in the data store 210.

The illumination source 220 illuminates the eye with unpolarized light from every possible incident angle (e.g., $[0, 2\pi]$). In various embodiments, the illumination source 220 is configured to generate corneal reflections directed towards the camera 230. The illumination source 220 includes one or more light sources that illuminate one or both eyes of the user. The illumination source 220 is an embodiment of the illumination source 176 that is described above in conjunction with FIG. 1.

The camera 230 captures one or more polarized images of the corneal surface. The captured images describe a polarization state of light reflected and/or scattered by the eye (e.g., eye reflections). In various embodiments, the camera 230 is one or more polarization sensitive cameras that are configured to detect the intensity of light at three or more different polarization angles. In still other embodiments, the camera 230 is further configured to capture linearly polarized light, circularly polarized light, or any combination thereof. In some embodiments, the camera 230 can detect the intensity of linearly light polarized at polarization angles 0°, 45°, 90°, and 135°. In other embodiments, camera 230 is configured to capture light linearly polarized light at one or more other polarization angles. That is, in in another example the camera 230 is configured to capture linearly polarized light at polarization angles of 0°, 15°, 30°, and 60°.

The camera 230 comprises an array of polarization sensitive pixels. In one or more embodiments, each polarization sensitive pixel. Here, the size of each polarization sensitive pixel is generally limited by the available CMOS production processes including the size of polarization filters. Each polarization sensitive pixel comprises a plurality native pixels. In an example embodiment, each native pixel is approximately 1-10 micrometers (μm) in length. In the example embodiment described above, a polarization sensitive pixel comprising the native pixels is between 3-30 μm in length. In other embodiments, a polarization sensitive pixel comprises fewer or more native pixels than three native pixels. The size of the associated polarization sensitive pixel may scale with the number, and size of the native pixels comprising the polarization sensitive pixel. The one or more native pixels are arranged in a pattern (i.e., the RGB Bayer pattern) and measurements from each of the one or more native pixels are interpolated between filters in a rectangular pattern, a triangular patter, or a square pattern. That is, a polarization sensitive pixel comprising three native pixels may be arranged such that interpolations happen triangularly, or 4-filters in a square pattern. Each native pixel includes a detector coupled to a polarization filter. In an embodiment, the polarization filter is configured allow linearly light polarized light at a particular polarization angle to pass through on to the detector while blocking linearly polarized light at other polarization angles. Said another way, each of the one or more native pixels in a polarization sensitive pixel is sensitive to linearly polarized light at a given polarization angle. The polarization filters may be composed of, e.g., polymer (e.g., film), or some other material. In one example embodiment, a camera 230 comprises an array of polarization sensitive pixels wherein each polarization sensitive pixel comprises four native pixels. Each native pixel is configured to detect linearly polarized light at a specific polarization angle. In the example embodiment described above, the four native pixels are configured to detect linearly polarization light at polarization angles 0°, 45°, 90°, and 135°.

In another embodiment, each polarization sensitive pixel is a pixel sensitive to the intensity of the incident light and the camera 230 is coupled to a dynamic polarizer. The dynamic polarizer is an optical filter that lets light waves of three or more specific polarizations pass and blocks light waves of all other polarizations. In various embodiments, the dynamic polarizer is a rotating physical polarizer, a voltage-controlled LCD film, or some other component capable of filtering light based on its polarization state. In these embodiments, the dynamic polarizer is placed somewhere in the optical path of the camera 230. For example, the dynamic polarizer is placed such that the light (e.g., corneal reflections traveling from the eye to the camera 230) must first pass through the dynamic polarizer. The camera 230 is configured to acquire the three or more polarization measurements temporally. That is, the camera 230 captures an image of the corneal surface at three or more different polarization states as the physical polarizer rotates. In one or more embodiments, the dynamic polarizer is configured to allow the passage of linearly polarized light in three or more polarization states to the array of pixels. For example, the mechanical polarization rotator is configured to allow linearly polarized light at angles of 0°, 45°, and 90° to pass through to the array of pixels. In the example, above the dynamic polarizer alternates between the polarization states to which it is permeable such that the camera 230 comprising an array of pixels operates at a speed greater than 90 frames per second (fps). That is, in the previous example, the camera 230 captures an image of the eye at a single polarization angle (e.g., one of 3+ polarization angles) once every 11 milliseconds. Thus, the camera 230 captures a full frame image with a single polarization angle, reads out the entire frame, and changes the polarization state of the dynamic polarizer at least three times every frame. The rate at which the dynamic polarizer alternates between the polarization states may be controlled electronically (e.g., by the controller 240). Alternating between different polarization states may be associated with a delay (e.g., full-frame read-out delay, and reset delay). One advantage of using a dynamic polarizer coupled to the camera 230 allows for the capture of images of the corneal surface with maximal resolution, as every pixel can yield a measurement independent of its neighboring pixels.

In an alternate embodiment, each polarization sensitive pixel is associated with one or more charge storage bins. Here, the charge accumulated on the polarization sensitive pixel while the pixel is exposed to light is sequentially dumped in to a particular charge storage bin associated with the polarization state of the dynamic polarizer. For example, as the dynamic polarizer changes polarization state, the polarization sensitive pixel changes the charge storage bin into which it dumps charge. In another embodiment, each polarization sensitive pixel is configured to alternate the polarization angle to which it is sensitive multiple times (e.g., 0°, 120°, 240°, 0°, 120°, 240°, 0°, 120°, 240°, ... ) The charge collected at each polarization angle is sequentially dumped into a charge storage bin associated with the polarization state of the light in order to interleave the captures. In still another embodiment, the dynamic polarizer continuously alternates the polarization angle to which it is permeable and charge collected at each polarization angle is dumped into the appropriate charge storage bin. In principle, any number of charge storage bins may be associated with a single polarization sensitive pixel. However, in practice, the number of charge storage bins may be limited by pixel size and desired dynamic range.

Examples of the camera 230 include a photodiode, a balanced/matched photodiodes, avalanche photodiode, a photomultiplier tube (PMT), a solid state detector, other suitable detector based on a single point detection, a still camera, a video camera, a linear photodiode array, a charge-coupled device (CCD) array, a complementary metal-oxide semiconductor (CMOS) array, or other suitable detector based on one or two-dimensional detector arrays. The camera 230 has a plurality of parameters such as focal length, focus, frame rate, ISO, sensor temperature, shutter speed, aperture, resolution, etc. In some embodiments, the camera 230 has a high frame rate and high resolution. The camera 230 can capture either two-dimensional images or three-dimensional images. The optical camera 230 is placed such that the eye reflections in response to the light from the illumination sources incident upon the eye can be captured over a range of eye movements. The camera 230 is further described, below, in conjunction with FIG. 3.

The controller 240 controls one or more components within the eye tracking system 200. In some embodiments, a single controller 240 may control the multiple eye tracking systems 200 such as one eye tracking system 200 for the left eye and another eye tracking system 200 for the right eye. The controller 240 is configured to communicate with the various modules within the eye tracking system 200 and facilitates communication between the modules comprising the eye tracking module 200. In an embodiment, the controller 240 generates one or more eye tracking instructions to control one or more of the camera 230, the illumination source 220, and the data store 210 in order to update a model of the eye 180. For example, the generated eye tracking instructions may activate the illumination source 220 including the camera 230. In other embodiments, the controller 240 is configured to retrieve one or more polarized intensity maps (e.g., images) of the corneal surface from the camera 230.

The one or more instructions may comprise instructions to modify one or more of the plurality of parameters associated with the camera 230. For example, the instructions may modify one or more of a focal length, a focus, a frame rate, an ISO, a shutter speed, an aperture, or a resolution associated with the optical detector. For example, the controller 240 generates instructions for the camera 230 to capture images of the corneal surface at a frame rate of 30 frames per second and a shutter speed of 1/400 (e.g., the shutter of the camera 230 is exposed to the eye reflections for 1/400$^{th}$ of a second). In still other embodiments, the controller 240 generates instructions to retrieve an eye model from an HMD console. The HMD console is further described below in conjunction with FIG. 5. The method of calibrating a model is further described below. The controller 240 may also facilitate communication between the eye tracking system 200 and the HMD console.

The controller 240 uses polarization information to determine a 3D shape of the eye. In various embodiments, the controller 240 determines one or more surface normals from the image of the eye captured by the camera 230. Each of the one or more surface normals is associated with a polarization sensitive pixel in the array of polarization sensitive pixels in the camera 230. A surface normal is a normalized vector (i.e., magnitude of 1) in three-dimensional space that is perpendicular to the image of the eye captured by a polarization sensitive pixel. The direction of the surface normal is defined by an azimuthal angle (i.e., angle between the X and Y axis) and a zenith angle (i.e., angle between the Z and X axis).

To determine a shape of the eye based on polarization information, the controller 240 receives light intensity received at each of the one or more polarization sensitive pixels. Typically, the intensity of the light reflected of the eye is a sinusoidal function of its polarization angle and the azimuthal angle. Thus, sampling the intensity of the linearly polarized light received from the eye at, at least, three polarization angles allows the determination of the azimuth angle of the surface normal. In an example embodiment, a polarization sensitive pixel comprises four native pixels configured to capture linearly polarized light at four different polarization angles (e.g., 0°, 45°, 90°, and 135°). In a different embodiment, the dynamic polarizer associated with a camera 230 is alternated between four different polarization angles (e.g., 0°, 45°, 90°, and 135°). In both of these example embodiments, at each polarization sensitive pixel captures a maximum and a minimum intensity as a function of incident polarization angle to determine an azimuthal angle associated with a surface normal at that pixel.

The controller 240 determines a degree of polarization associated with the light captured at each polarization sensitive pixel in the array of polarization sensitive pixels. In one or more embodiments, the degree of polarization of the light captured at a polarization sensitive pixel is a ratio of the difference between the maximum and minimum intensities and the sum of the maximum and minimum intensities received at a given polarization sensitive pixel. Generally, the degree of polarization of an eye reflection is a function of the index of refraction and the zenith angle. In various embodiments, the controller 240 estimates a zenith angle of a surface normal using a closed form solution to a Fresnel equation relating the degree of polarization and zenith angle. In other embodiments, the controller 240 determines zenith angle by various numerical optimization techniques known to one skilled in the art.

The controller 240 determines a 3D shape of the eye (e.g., eye 180) based on the determined surface normal at each polarization sensitive pixel. Typically, the determined surface normal at a particular polarization sensitive pixel is parallel to the gradient of the surface of the eye corresponding to that polarization sensitive pixel. Said another way, a surface $f_p$ (e.g., the eye 180) corresponding to a polarization sensitive pixel p is associated with the plane $L_p$. The plane $L_p$ is a tangent plane of the surface $f_p$ and roughly approximates the surface $f_p$ near the polarization sensitive pixel p.

Thus it follows that the mathematical union of the planes $L_p$ roughly approximates the surface $f_p$. In various embodiments, the control module 240 reduces the ambiguity associated with determining a shape of the eye by assuming that the eyeball is roughly a sphere.

Each determined surface normal uniquely identifies a plane $L_p$. The controller 240 is configured to stitch planes $L_p$ associated with adjacent polarization sensitive pixels together to form a curved surface associated with a composite 3D image of the eye. In various embodiments, the plane $L_p$ associated with adjacent pixels are stitched together using a map projection technique (e.g., a rectilinear projection, a cylindrical project, a spherical projection, a Pannini projection, or a stereographic projection). In other embodiments, the one or more surface normals are segmented such that each segment is associated with a plane $L_p$ wherein the planes $L_p$ may define a curved surface associated with a model component (i.e., cornea, sclera).

The controller 240 extracts one or more model parameters from the determined 3D shape of the eye. In one or more embodiments, the controller 240 maps a model of the eye to the determined 3D shape of corneal surface to determine one or more model parameters (e.g., sphere radius, sphere centroid, optical axis, etc.). In an embodiment, the controller 240 is configured to segment the determined 3D shape of the eye into one or more segments (e.g., the sclera and corneal surface). Each of the two segments of the 3D shape is mapped to a sphere associated with the model (e.g., eye sphere and corneal sphere). For example, a change in the radius of curvature between different segments of the 3D model of the eye is used to differentiate portions of the 3D shape of the eye corresponding to the two spheres comprising the model of the eye. The controller 240 also extracts other model parameters (e.g., a center location of the corneal sphere, a radius of the eye sphere, a center of the eye sphere, a pupil diameter, and a pupil location) from the determined 3D shape of the eye.

In one or more embodiments, generating a 3D shape of the eye comprises generating a depth map of the eye 180. A depth map is generated by applying a geometric-based technique. In one or more embodiments, the geometric-based technique may be combined with a photometric approach. In these embodiments, the geometric-based technique removes the ambiguities in the photometric techniques and generates a course depth map of the eye. Some examples of photometric approaches include shape-from-shading (SfS) or uncalibrated photometric stereo (PS). The controller 240 may combine the generated course depth map of the eye with the one or more surface normals to obtain a 3D shape of eye. Methods of combining one or more surface normals with course depth maps to generate a 3D shape of the eye are well known to one skilled in the art.

The controller 240 updates an existing model of the eye (e.g., eye 180) based on the determined 3D shape of the eye. In various embodiments, updating a model includes activating the illumination source 220 and capturing one or more images including eye reflection at the camera 230 while the user is viewing known locations on the HMD 100. The one or more captured images are further processed in order to generate a depth map of the eye. The controller 240 extracts one or more values of the model parameters from the generated depth map (e.g., sphere radius, sphere centroid, etc.). In one or more embodiments, the controller 240 retrieves an existing model of the eye from the data store 210 and determines a difference between the one or more extracted parameter values and the one or more stored parameter values associated with the existing model. Responsive to determining a difference, the controller 240 updates one or more of the model parameter values associated with the existing model of the eye. For example, if the controller 240 determines that the smaller sphere associated with an existing model of the eye previously has a radius of 8 mm and the extracted parameter value for the radius of the smaller sphere is 25 mm, the controller 240 updates the model parameter values associated with the existing model of the eye. Typically, updating the eye model comprises adjusting the eye model parameters stored associated with the model in the data store 210. For example, based on the determined 3D shape of the eye, the controller 240 adjusts one or more model parameter values (e.g., radii and a center of a sphere) associated with the existing eye model. In various embodiments, the existing model of the eye is replaced with the updated model of the eye in the data store 210. The process of updating an existing model is further described below in conjunction with FIGS. 3 and 4. The updated model of the eye may be used to determine eye tracking information. Methods of determining eye tracking information from an updated model of the eye are described below in conjunction with FIG. 3.

Eye Tracking System for Determining a Shape of the Eye

Figure 3:
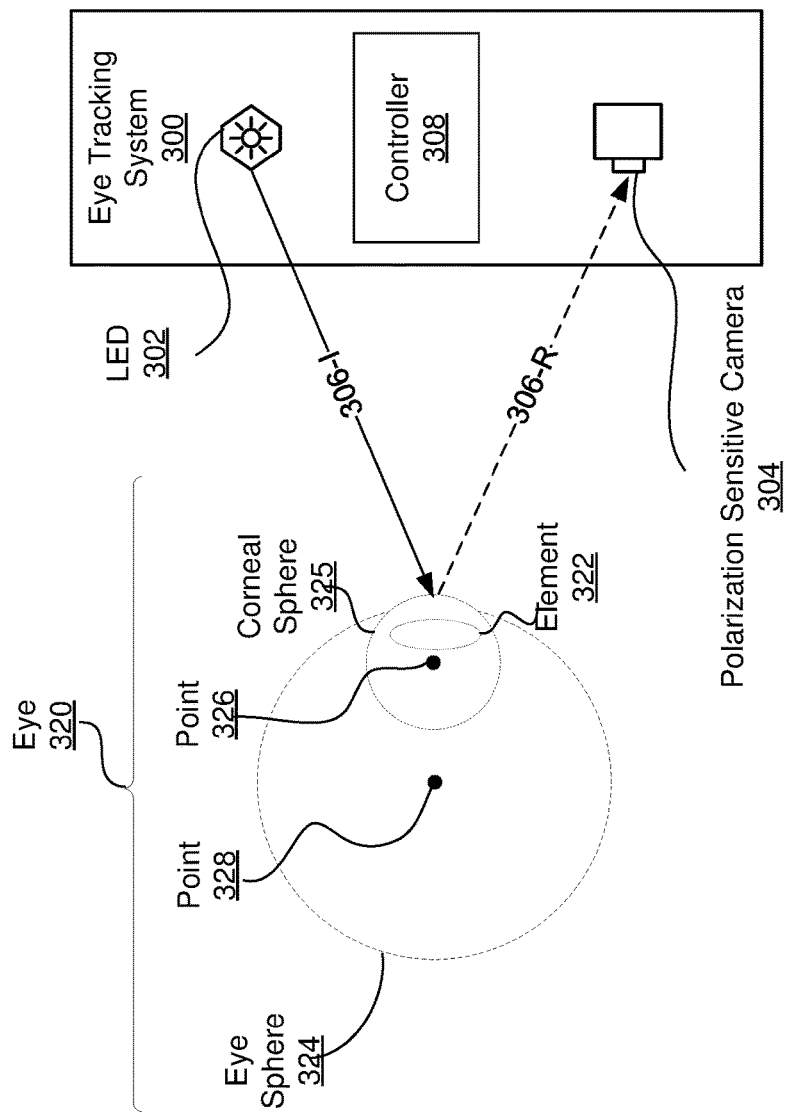
FIG. 3 depicts an example operation of the eye tracking system of FIG. 2, in accordance with an embodiment.

FIG. 3 depicts an example operation of the eye tracking system 300, in accordance with an embodiment. FIG. 3 depicts the eye tracking system 300 imaging an eye of the user (e.g., eye 320). Here the eye 320 is super imposed by an eye model. As illustrated in FIG. 3, the eye tracking system 300 includes an LED 302, and a polarization sensitive camera 304. Here the eye tracking system 300 is an embodiment of the eye tracking system 200. Both the infrared LED 302 and the polarization sensitive camera 304 are embodiments of the illumination source 220 and the camera 230, respectively. For simplification, the discussion of the eye tracking system 300 is about a single eye of the user. However, in some embodiments, a separate eye tracking system 300 is employed for each of the user's eyes 320. In such embodiments, each of the eye tracking systems 300 is configured to update a separate eye model wherein each eye model represents a different eye 320 (e.g., left, right). In such the embodiments, each eye tracking system 300 is additionally configured to communicate amongst themselves and a console associated with the HMD.

In FIG. 3, polarization sensitive camera 304 is placed such that the eye reflections in response to the light from the LED 302 incident upon the eye can be captured over a range of eye movements. In this embodiment, the eye tracking system 300 and the LED 302 are placed off-axis such that they are not in the light of sight of the user. In one or more embodiments, the LED 302 is a plurality of LEDs 302. In various embodiments, the LEDs 302 are arranged such that they specifically illuminate the eye 180. For example, the plurality of LEDs 302 may be arranged in a ring formation around an eye 180. In other embodiments, the plurality of LEDs 302 may be arranged in other conformations such that they optimally illuminate with light.

Light 306-I illustrates one of the plurality of light rays emitted by the LED 302. The light 306-I is incident upon the eye 320 produces multiple reflections such as a reflection from the outer surface of the cornea and another reflection from the inner surface of the cornea. Light 306-R represents one of the plurality of light rays reflected from the eye 320. In one or more embodiments, the light 306-R is directed towards the polarization sensitive camera 304. In one embodiment, the polarization sensitive camera 304 captures the intensity of the reflected light 306-R and a polarization angle. For example, in FIG. 3, the intensity and polarization angle of the reflected light represented by arrow 302-R is captured in images captured by the polarization sensitive camera 304. Alternatively, or additionally, the polarization sensitive camera 304 captures intensity and the polarization angle associated with the reflected light 306-R from the inner surface of the cornea.

An example normal mode of operation of the eye tracking system 300 includes activating the LED 302 and illuminating the corneal surface of an eye 320 with light 306-I. Illumination of the corneal surface of the eye 320 results in a reflected light ray 306-R directed towards the polarization sensitive camera 304. The reflected light 306-R is captured by the polarization sensitive camera 304. During the normal mode of operation, a controller (e.g., controller 240) determines the 3D shape of the eye 320 and retrieves a stored eye model associated with the user's eye (e.g., eye 320) from the data store associated with the eye tracking system (e.g., data store 210). Responsive to determining a difference between one or more model parameters associated with the determined 3D shape of the eye and the one or more model parameters associated with the stored eye model, the controller updates the stored eye model and determines eye tracking information (e.g., gaze direction). An example mode of operation of the eye tracking system 200 is further described below in conjunction with FIG. 4.

The eye tracking system 300 updates a model of the eye. The model for the eye, including one or more model parameter values associated with the retrieved model, is retrieved from a data store (e.g., data store 210) described above in conjunction with FIG. 2. In an example state of operation, the eye tracking system 300 retrieves stored a model of a human eye 320 from the data store 210. As depicted in FIG. 3, the eye model 320 comprises two spheres: an eye sphere 324 and a corneal sphere 325. Each of spheres, eye sphere 324 and corneal sphere 325, has different radii such that the radius of eye sphere 324 is larger than that of corneal sphere 325. Here, a portion of the eye sphere 324 approximates the overall eye and a portion of the corneal sphere 325 represents the cornea of the eye. Element 322 represents the iris. The center (or origin) of the eye sphere 324 is represented by point 306 and the center of corneal sphere 325 is represented by point 311. Element 315 represents the lens of the eye. In other embodiments, the cornea may be modeled as a complex surface.

Reflections of light 306-I from the eye 320 result in light 306-R wherein the polarization state of light 306-R may be different from the polarization state of the light 306-I. The change in polarization state of the eye reflections is captured by the polarization sensitive camera 304. Based on the polarization state of the eye reflections, the eye tracking unit 300 generates a depth map of the corneal surface. In an embodiment, the generated depth map of the corneal surface is used to determine a radius of curvature of the overall eye and the cornea. The radius of curvature of the overall eye and the cornea may be used to determine the radii of spheres 324 and 325, respectively. For example, the curvature of the overall eye, as determined from generated depth map, is used to determine a value for the radius of the eye sphere 324 and radius of curvature of the cornea. In various embodiments, the determined radius of curvature of the cornea and the overall eye are additionally used to determine the relative locations of point 326 and point 328. In still other embodiments, the eye tracking system 300 utilizes intensity data associated with the received eye reflections (e.g., absorption data) to determine a size and shape of element 322.

The eye tracking unit 360 updates the eye model based on the determined 3D shape of the eye in order to track the motion of the center of the corneal sphere 325 during the rotation of the eye as the user rotates their eye to look at various objects in the HMD 510. In various embodiments, updating an eye model comprises updating one or more model parameters associated with an eye model 320 based on a determined difference between a stored value associated with a model parameter and determined value of the model parameter. In one or more embodiments, the eye model 320 is updated in real-time as the user rotates their eyes to look at various objects in the HMD 510. An example process for updating a model is described further, below, in conjunction with FIG. 4.

The eye tracking system 300 additionally determines eye tracking information associated with the eye based on one or more model parameters. Eye tracking information includes eye orientation, eye rotation, aspheric eye shape, and eye deformation under rotation. For example, the center 306 of eye sphere 324 is a function of the cornea position and enables determining of aspheric eye shapes, oculomotor muscle control, deformation under rotation, etc. In various embodiments, the eye tracking system 300 determines a gaze direction based on the determined eye tracking information. In various embodiments, eye information is also stored in the data store 210. In still other embodiments, the eye model information is stored in a separate database associated with the eye tracking system 300.

Eye Tracking Process

Figure 4:
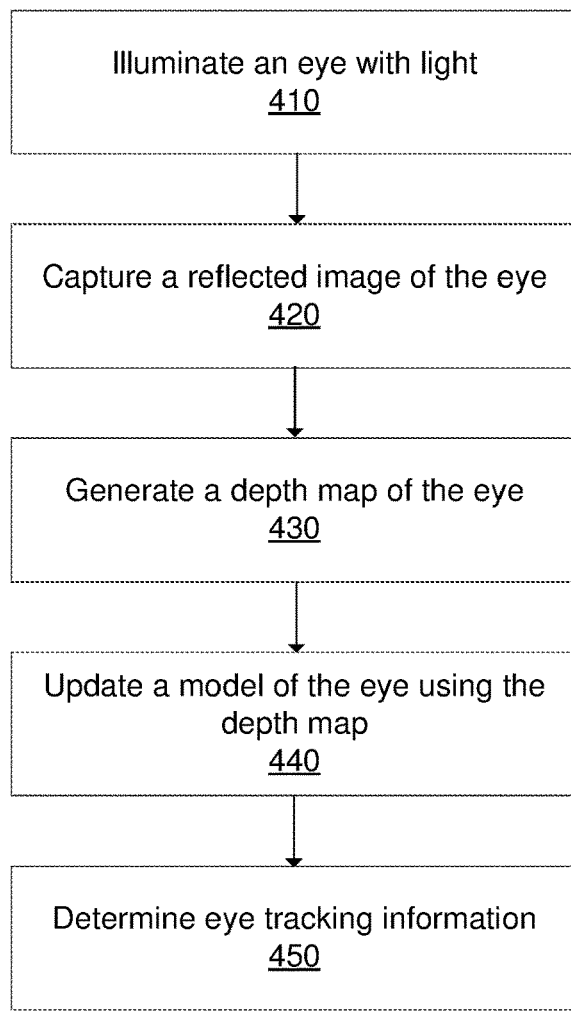
FIG. 4 is a flowchart of an example process for updating a model of an eye and determining eye tracking information in accordance with an embodiment.

FIG. 4 is a flowchart of an example process 400 for updating a model of an eye 180 and determining eye tracking information in accordance with an embodiment. The process illustrated in conjunction with FIG. 4 may be performed by the eye tracking system 200. In other embodiments, the process 400 may be performed by different and/or additional modules.

The eye tracking system 200 illuminates 410 a user's eye (e.g., the eye 180) with light. In an embodiment, the eye is illuminated by an illumination source (e.g., the illumination source 220). The illumination source emits light which is incident on the eye such that a surface of the eye reflects the incident light. The reflection causes changes in polarization that can be used to determine depth information. In some embodiments, the illumination source emits polarized light (e.g., linearly polarized). In alternate embodiments, the illumination source emits unpolarized light.

The eye tracking system 200 captures 420 one or more images of the eye. In various embodiments, the captured images of the eye comprise intensity information including one or more polarization angles associated with the reflected light. The determination of polarization angles and intensity information by the eye tracking system 200 is further described above in conjunction with FIGS. 2 and 3.

The eye tracking system 200 determines 430 a 3D shape of the eye (e.g., eye 180). In various embodiments, the determined 3D shape of the eye is based on one or more surface normals determined from the captured 420 intensity and polarization information associated with the reflected light (e.g., light 306-R). Each of the one or more surface normals is associated with a portion of the surface of the eye being imaged. The surface normal is used to determine a plane in 3D space that is tangent to the surface of the eye at that point on of the eye being imaged. In one or more embodiments, the eye tracking system 200 combines adjacent tangent surfaces to determine a 3D shape of the eye. In various embodiments, the eye tracking system 200 stitches each of the tangent planes together to determine the 3D shape of the eye and extracts one or more model parameter from the determine 3D shape of the eye. Determining a 3D shape the eye is further described, above, in conjunction with FIG. 2.

The eye tracking system 200 updates 440 a model of the eye (e.g., eye 180) using the determined 3D shape of the eye. In various embodiments, the eye tracking system 200 retrieves a stored eye model (e.g., the model 320) from a data store (e.g., the data store 200). In still other embodiments, the eye tracking system 200 retrieves a model of the eye from an external source (e.g., a console associated with the HMD). In alternate embodiments, the eye tracking system 200 generates a model of the eye based on the determined 3D shape of the eye. As the user looks at various objects in the HMD, the eye tracking system 200 may periodically determine a 3D shape of the eye of the eye and extracts one or more model parameter values (e.g., radii and the relative locations of the spheres) and compare the extracted model parameter values to stored model parameter values. Responsive to determining a difference between one or more of the extracted model parameter values and the stored model parameter values, the eye tracking system 300 updates 450 the model parameter values associated with the stored model.

The eye tracking system 300 determines 450 eye tracking information based on the updated model. In one or more embodiments, the eye tracking information (e.g., user's gaze) is determined in real-time based on the updated eye model. Eye tracking information described above in conjunction with FIG. 2.

HMD System Overview

Figure 5:
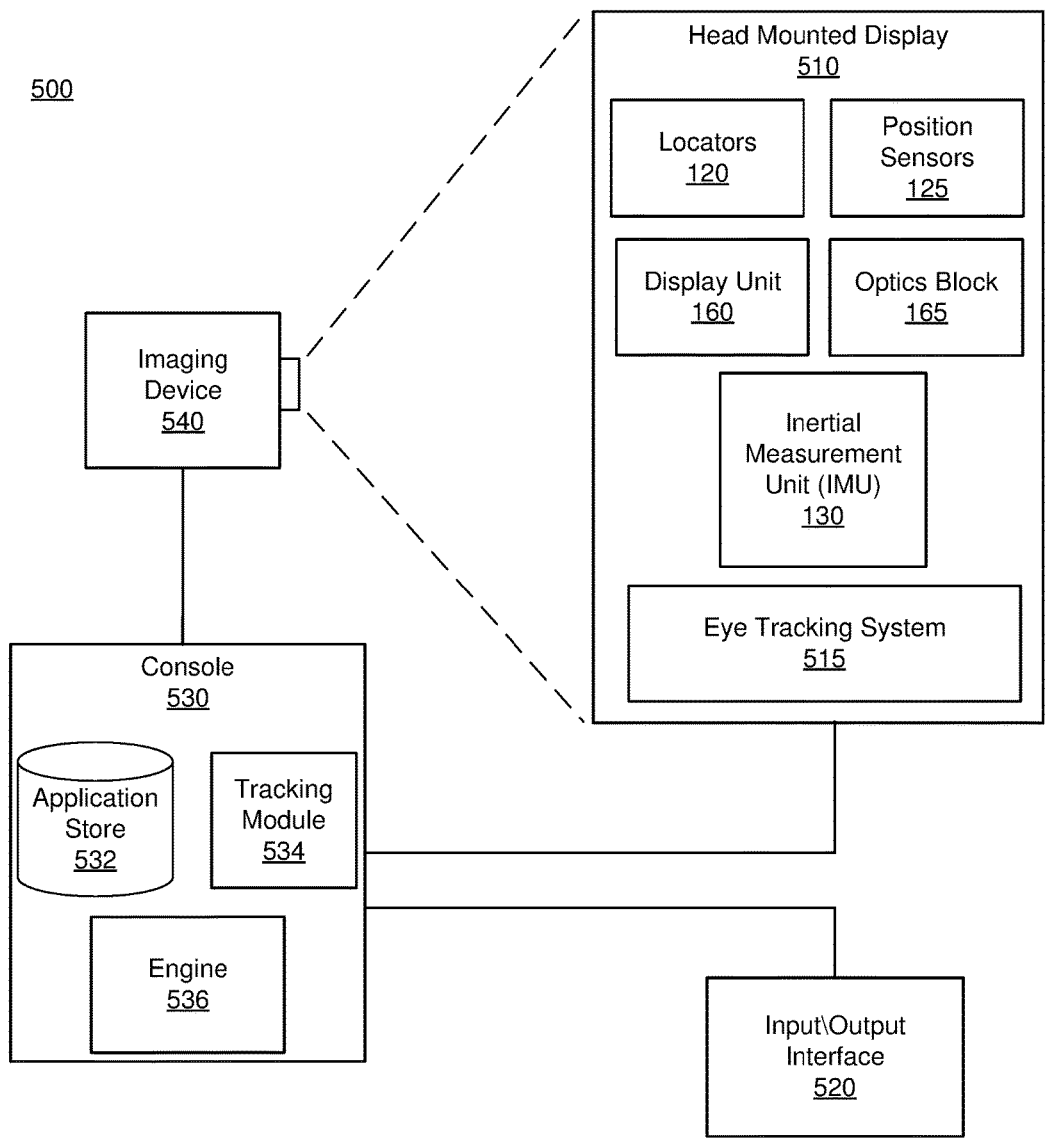
FIG. 5 is a block diagram of a HMD system, in accordance with an embodiment.

FIG. 5 is a block diagram of a HMD system 500, in accordance with an embodiment. The HMD system 500 may operate in a VR system environment, an AR system environment, a MR system environment, or some combination thereof. The HMD system 500 shown by FIG. 5 comprises a HMD 510, an input/output (I/O) interface 520 that are each coupled to a console 530, and an imaging device 540. While FIG. 1 shows an example system 100 including one HMD 510, one I/O interface 520, and one imaging device 540 in other embodiments any number of these components may be included in the HMD system 500. For example, there may be multiple HMDs 510 each having an associated I/O interface 520 and being monitored by one or more imaging devices 540, with each HMD 510, I/O interface 520, and imaging devices 540 communicating with the HMD console 530. In alternative configurations, different and/or additional components may be included in the system environment 500.

The HMD 510 presents content to a user. Examples of content presented by the HMD 510 include one or more images, video, audio, or some combination thereof. In some embodiments, audio is presented via an external device (e.g., speakers and/or headphones) that receives audio information from the HMD 510, the console 530, or both, and presents audio data based on the audio information. An embodiment of the HMD 510 is further described above in conjunction with FIGS. 1A and 1B. The HMD 510 may comprise one or more rigid bodies, which may be rigidly or non-rigidly coupled to each other. A rigid coupling between rigid bodies causes the coupled rigid bodies to act as a single rigid entity. In contrast, a non-rigid coupling between rigid bodies allows the rigid bodies to move relative to each other.

The HMD 510 includes one or more locators 120, one or more position sensors 125, an inertial measurement unit (IMU) 130, an eye tracking system 515, display unit 160, and an optics block 165. The display unit 160, the optics block 165, the one or more locators 120, the one or more position sensors 125, and IMU 130 are described, above, in conjunction with FIGS. 1A and 1B.

The eye tracking system 515 determines a 3D shape of the user's eye based on captured polarization information. The eye tracking system 515, is an embodiment of the eye tracking system 200 described above in conjunction with FIG. 2. The eye tracking system 515 includes an illumination source (e.g., the illumination source 220) and a camera (e.g., the camera 230). The illumination source is configured to illuminate an outer portion of the user's eye thus generating eye reflections directed towards the camera. In various embodiments, the camera (e.g., the camera 230) is a polarization sensitive camera. The imaging device captures one or more images of the corneal surface including intensity and polarization information associated with the eye reflections. The eye tracking system 515 determines a 3D shape of the eye based on the captured intensity and polarization information associated with the eye reflections. In various embodiments, the eye tracking system 515 extracts one or more model parameter values from the determined 3D shape of the eye and updates a stored model of the eye responsive to a difference between a stored model parameter value and an extracted model parameter value.

The I/O interface 520 is a device that allows a user to send action requests to the HMD console 530. An action request is a request to perform a particular action. For example, an action request may be to start or end an application or to perform a particular action within the application. The I/O interface 520 may include one or more input devices. Example input devices include: a keyboard, a mouse, a game controller, or any other suitable device for receiving action requests and communicating the received action requests to the HMD console 530. An action request received by the I/O interface 520 is communicated to the HMD console 530, which performs an action corresponding to the action request. In some embodiments, the I/O interface 520 may provide haptic feedback to the user in accordance with instructions received from the HMD console 530. For example, haptic feedback is provided when an action request is received, or the HMD console 530 communicates instructions to the I/O interface 520 causing the I/O interface 520 to generate haptic feedback when the HMD console 530 performs an action.

The HMD console 530 provides content to the HMD 510 for presentation to the user in accordance with information received from one or more of: the imaging device 540, the HMD 510, and the I/O interface 520. In the example shown in FIG. 5, the HMD console 530 includes an application store 532, a tracking module 534, and an engine 536. Some embodiments of the HMD console 530 have different modules than those described in conjunction with FIG. 5. Similarly, the functions further described below may be distributed among components of the HMD console 530 in a different manner than is described here.

The application store 532 stores one or more applications for execution by the HMD console 530. An application is a group of instructions, that when executed by a processor, generates content for presentation to the user. Content generated by an application may be in response to inputs received from the user via movement of the HMD 510 or the input interface 540. Examples of applications include: gaming applications, conferencing applications, video playback application, or other suitable applications.

The tracking module 534 calibrates the system 500 using one or more calibration parameters and may adjust one or more calibration parameters to reduce error in determination of the position of the HMD 510. For example, the tracking module 534 adjusts the focus of the imaging device 540 to obtain a more accurate position for observed locators on the HMD 510. Moreover, calibration performed by the tracking module 534 also accounts for information received from the IMU 530. Additionally, if tracking of the HMD 510 is lost (e.g., the imaging device 540 loses line of sight of at least a threshold number of the locators 520), the tracking module 140 re-calibrates some or the entire system environment 500.

The tracking module 534 tracks movements of the HMD 510 using slow calibration information from the imaging device 540. The tracking module 534 determines positions of a reference point of the HMD 510 using observed locators from the slow calibration information and a model of the HMD 510. The tracking module 534 also determines positions of a reference point of the HMD 510 using position information from the fast calibration information. Additionally, in some embodiments, the tracking module 534 may use portions of the fast calibration information, the slow calibration information, or some combination thereof, to predict a future location of the headset 105. The tracking module 534 provides the estimated or predicted future position of the HMD 510 to the Engine 536.

The engine 536 executes applications within the system environment 500 and receives position information, acceleration information, velocity information, predicted future positions, or some combination thereof of the HMD 510 from the tracking module 534. Based on the received information, the engine 555 determines content to provide to the HMD 510 for presentation to the user. For example, if the received information indicates that the user has looked to the left, the engine 536 generates content for the HMD 510 that mirrors the user's movement in a virtual environment. Additionally, the engine 536 performs an action within an application executing on the HMD console 530 in response to an action request received from the I/O interface 520 and provides feedback to the user that the action was performed. The provided feedback may be visual or audible feedback via the HMD 510 or haptic feedback via the I/O interface 520.

The engine 536 may be configured to utilize eye tracking information determined by the eye tracking module 515 for a variety of display and interaction applications. The various applications include, but are not limited to, providing user interfaces (e.g., gaze-based selection), attention estimation (e.g., for user safety), gaze-contingent display modes (e.g., foveated rendering, varifocal optics, adaptive optical distortion correction, synthetic depth of field rendering), metric scaling for depth and parallax correction (e.g., IPD and eye-box adjustment), etc. In some embodiments, based on information about position and orientation of the user's eye received from the eye tracking system 534, the engine 536 determines resolution of the content provided to the HMD 510 for presentation to the user on the display unit 515. The engine 536 provides the content to the HMD 510 having a maximum pixel density (maximum resolution) on the display unit 515 in a foveal region of the user's gaze, whereas the engine 536 provides a lower pixel resolution in other regions of the display unit 515, thus achieving less power consumption at the HMD 510 and saving computing cycles of the HMD console 530 without compromising a visual experience of the user. In some embodiments, the engine 536 can be configured to optimize the performance of viewing optics of the HMD 510 (e.g., components of the display unit 160), based on the eye tracking information obtained from the eye tracking system 534. In one embodiment, the engine 536 can adjust optical distortion correction parameters of the viewing optics, e.g., to prevent vergence-accommodation conflict. In an alternate embodiment, the engine 536 can adjust focus of images displayed on the display unit 160, e.g., to prevent vergence-accommodation conflict.

The imaging device 540 generates slow calibration data in accordance with calibration parameters received from the HMD console 530. Slow calibration data includes one or more images showing observed positions of the locators 520 that are detectable by the imaging device 540. The imaging device 540 may include one or more cameras, one or more video cameras, any other device capable of capturing images including one or more of the locators 520, or some combination thereof. Additionally, the imaging device 540 may include one or more filters (e.g., used to increase signal to noise ratio). The imaging device 540 is configured to detect light emitted or reflected from locators 520 in a field of view of the imaging device 540. In embodiments where the locators 520 include passive elements (e.g., a retro-reflector), the imaging device 540 may include a light source that illuminates some or all of the locators 520, which retro-reflect the light towards the light source in the imaging device 540. Slow calibration data is communicated from the imaging device 540 to the HMD console 530, and the imaging device 540 receives one or more calibration parameters from the HMD console 530 to adjust one or more imaging parameters (e.g., focal length, focus, frame rate, ISO, sensor temperature, shutter speed, aperture, etc.).

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A head-mounted display (HMD) comprising:
   an eye tracking system that includes:
      one or more illumination sources configured to periodically illuminate an eye of a user with light, and
      an optical detector comprising a plurality of polarization sensitive pixels configured to:
         capture one or more images of the eye, and
         determine intensity information and polarization information associated with the one or more images; and
      a controller configured to:
         determine a three-dimensional (3D) shape of the eye based on the determined intensity and polarization information,
         update a model of the eye based on the determined 3D shape of the eye, and
         determine eye tracking information associated with the updated model of the eye, the eye tracking information including an eye orientation of the eye.

2. The HMD of claim 1, wherein the one or more illumination sources are configured to emit unpolarized light.

3. The HMD of claim 1, wherein the one or more illumination sources are integrated into a display unit configured to display one or more images.

4. The HMD of claim 1 wherein each of the plurality of polarization sensitive pixels includes three or more native pixels wherein each of the three or more native pixels comprises a CMOS detector coupled to a polarization filter.

5. The HMD of claim 1, wherein determining a 3D shape of the eye comprises:
   determining a plurality of surface normals associated with each of the plurality of polarization sensitive pixels; and
   for each of the plurality of the determined surface normals, determining a tangent plane; and
   merging each of the determined tangent planes.

6. The HMD of claim 5 wherein determining a plurality of surface normals comprises:
   for each of the plurality of polarization sensitive pixels:
      capturing, for at least three polarization angles, an intensity of the reflected light,
      determining an azimuthal angle associated with the reflected light based on the determined polarization angle and the intensity,
      determining a degree of polarization of the reflected light, and
      determining a zenith angle based in part on the determined degree of polarization.

7. The HMD of claim 1, wherein updating the model of the eye based on the determined 3D shape of the eye comprises:
   retrieving one or more model parameter values associated with a stored model of the eye;
   extracting one or more model parameter values from the determined 3D shape of the eye;
   responsive to determining a difference between at least one of the one or more stored model parameters values and the one or more extracted model parameters values, updating at least one of the one or more model parameters by replacing the one or more stored model parameter values with the one or more extracted model parameters values; and
   storing the updated model in a data store associated with the eye tracking module.

8. The method of claim 7, wherein the stored model of the eye comprises a first sphere that describes a shape of a sclera of the eye and a second sphere that describes a shape of a cornea of the eye, the stored model is parameterized by a radius associated with each of the two spheres, a location of the centers of each of the two spheres, and a distance between the centers each of the two spheres.

9. The HMD of claim 1, wherein the determined eye tracking information includes one or more of a gaze direction, a vergence angle, a vergence depth, and an accommodation depth.

10. The HMD of claim 1, further comprising:
   a display unit configured to emit content; and
   an optics block configured to direct the content to an eyebox of the HMD wherein the emitted content is based at least in part on the eye tracking information.

11. The HMD of claim 1, wherein the determined eye tracking information is utilized to enable one or more of: a gaze-based selection, an attention estimation, one or more gaze-contingent display modes.

12. A head-mounted display (HMD) comprising:
   a display unit including one or more illumination sources, the display unit configured to emit content and illuminate an eye of a user,
   an eye tracking system that includes:
      an optical detector comprising a plurality of polarization sensitive pixels configured to:
         capture one or more images of the eye, and
         determine intensity information and polarization information associated with the one or more images; and
      a controller configured to:
         determine a three-dimensional (3D) shape of the eye based on the determined intensity and polarization information,
         update a model of the eye based on the determined 3D shape of the eye, and
         determine eye tracking information associated with the updated model of the eye, the eye tracking information including an eye orientation of the eye.

13. The HMD of claim 12, wherein determining a 3D shape of the eye comprises:
   determining a plurality of surface normals associated with each of the plurality of polarization sensitive pixels; and
   for each of the plurality of the determined surface normals, determining a tangent plane; and
   merging each of the determined tangent planes.

14. The HMD of claim 13 wherein determining a plurality of surface normals comprises:
   for each of the plurality of polarization sensitive pixels:
      capturing, for at least three polarization angles, an intensity of the reflected light,
      determining an azimuthal angle associated with the reflected light based on the determined polarization angle and the intensity,
      determining a degree of polarization of the reflected light, and
      determining a zenith angle based in part on the determined degree of polarization.

15. The HMD of claim 12, wherein updating a model of the eye based on the determined 3D shape of the eye comprises:
   retrieving one or more model parameter values associated with a stored model of the eye;
   extracting one or more model parameter values from a depth map;
   responsive to determining a difference between at least one of the one or more stored model parameters values and the one or more extracted model parameters values, updating at least one of the one or more model parameters by replacing the one or more stored model parameter values with the one or more extracted model parameters values; and
   storing the updated model in a data store associated with the eye tracking module.

16. The method of claim 15, wherein the stored model of the eye comprises a first sphere that describes a shape of a sclera of the eye and a second sphere that describes a shape of a cornea of the eye, the stored model is parameterized by a radius associated with each of the two spheres, a location of the centers of each of the two spheres, and a distance between the centers each of the two spheres.

17. The HMD of claim 12, wherein the determined eye tracking information includes one or more of a gaze direction, a vergence angle, a vergence depth, and an accommodation depth.

18. A head-mounted display (HMD) comprising:
an eye tracking system that includes:
- one or more illumination sources configured to illuminate an eye of a user with polarized light, and
- an optical detector comprising a plurality of polarization sensitive pixels coupled to a dynamic polarizer, each of the polarization sensitive pixels configured to:
  - capture one or more images of the eye, and
  - determine intensity information and polarization information associated with the one or more images; and
- a controller configured to:
  - generate a depth map associated with the one or more captured images using the determined intensity and polarization information,
  - update a model of the eye based on the depth map, and
  - determine eye tracking information associated with the updated model of the eye, the eye tracking information including an eye orientation of the eye.

19. The HMD of claim 18 wherein the dynamic polarizer is an optical filter that is permeable to light waves of three or more polarization states.

20. The HMD of claim 18, wherein generating a depth map comprises:
for each of the plurality of polarization sensitive pixels:
- receiving an intensity of the reflected light at each of three or more polarization angles,
- determining an azimuthal angle associated with the reflected light based on the determined polarization angle and the intensity,
- determining a degree of polarization of the reflected light, and
- determining a zenith angle based in part on the determined degree of polarization.

* * * * *